June 22, 1948.  R. R. YOUNGER  2,444,000
INVERTED TURBINE PRESSURE UNIT
Filed Jan. 2, 1946  2 Sheets-Sheet 1
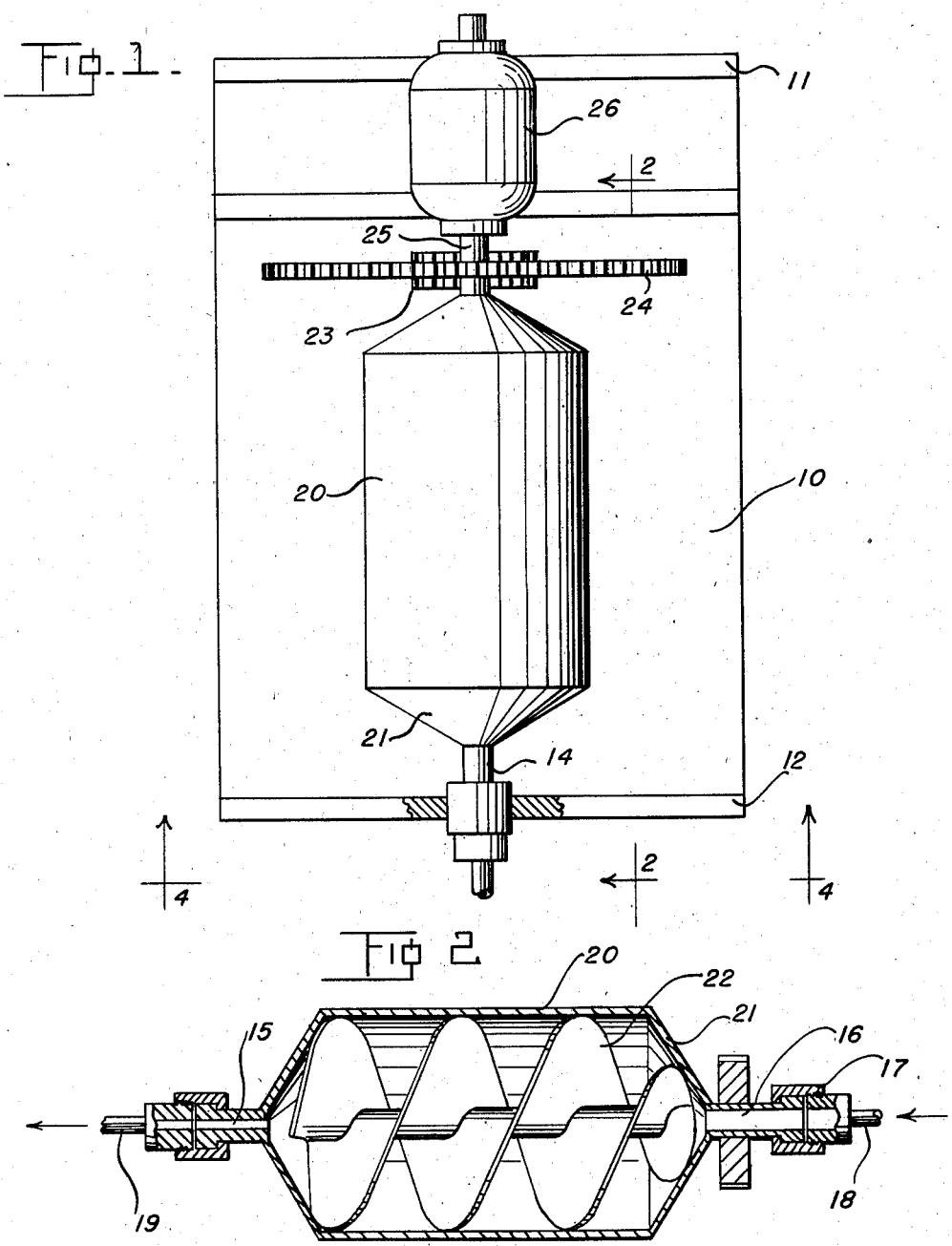
INVENTOR.
REAT R. YOUNGER
BY *Victor J. Evans & Co.*
ATTORNEYS June 22, 1948. R. R. YOUNGER 2,444,000
INVERTED TURBINE PRESSURE UNIT
Filed Jan. 2, 1946 2 Sheets-Sheet 2

INVENTOR.
REAT R. YOUNGER
BY *Victor J. Evans & Co.*
ATTORNEYS

Patented June 22, 1948

2,444,000

UNITED STATES PATENT OFFICE 2,444,000

INVERTED TURBINE PRESSURE UNIT

Reat R. Younger, San Francisco, Calif.

Application January 2, 1946, Serial No. 638,613

1 Claim. (Cl. 103—91)

The invention relates to a rotary fluid pressure unit, and more especially to an inverted turbine pressure unit.

The primary object of the invention is the provision of a unit of this character, wherein through the operation of an encased spiral rotor mechanically rotated, the flow pressure of liquid can be increased for a steady flow pumping activity in the use of such unit, the latter being of novel construction, and is unique in the assembly of the parts thereof.

Another object of the invention is the provision of a unit of this character, wherein the same operates as a pressure booster for the flow of fluids through power driving of such unit, the latter being compact, and is possessed of few parts, thus being economical for repairs and inexpensive to operate.

A further object of the invention is the provision of a unit of this character, which is simple in construction, thoroughly reliable and efficient in operation, strong, durable, readily and easily operated, positive in action, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a plan view of the unit constructed in accordance with the invention, and partly broken away;

Figure 2 is a sectional view taken on the line 2—2 of Figure 1 looking in the direction of the arrows;

Similar reference characters indicate corresponding parts throughout the several views in the drawings.

Figure 3:
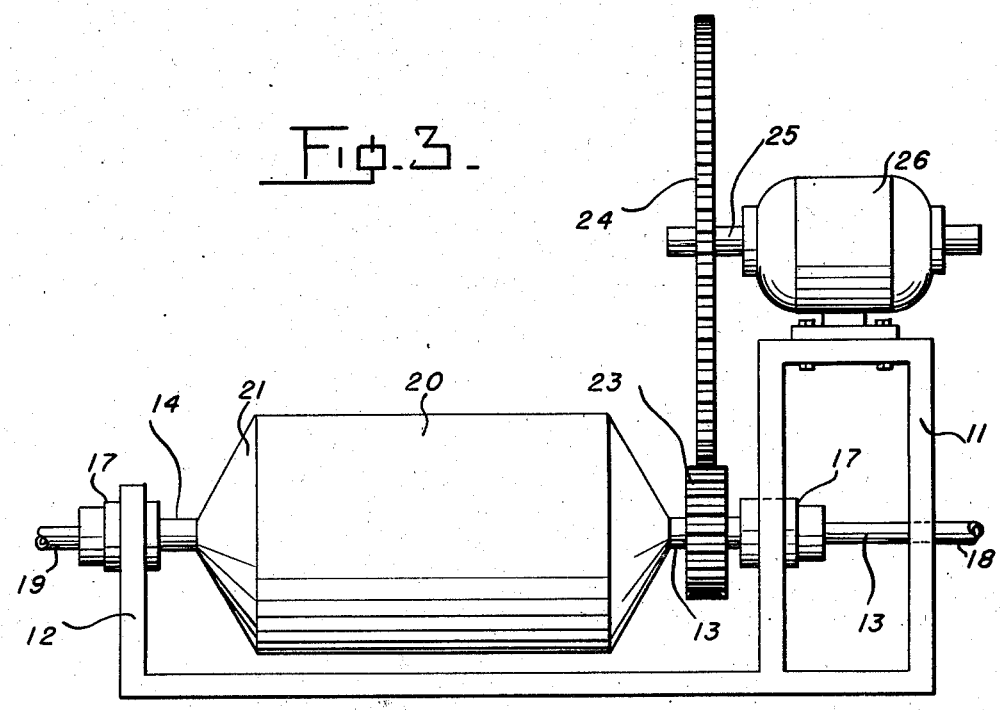
Figure 3 is a side view thereof.
Figure 4:
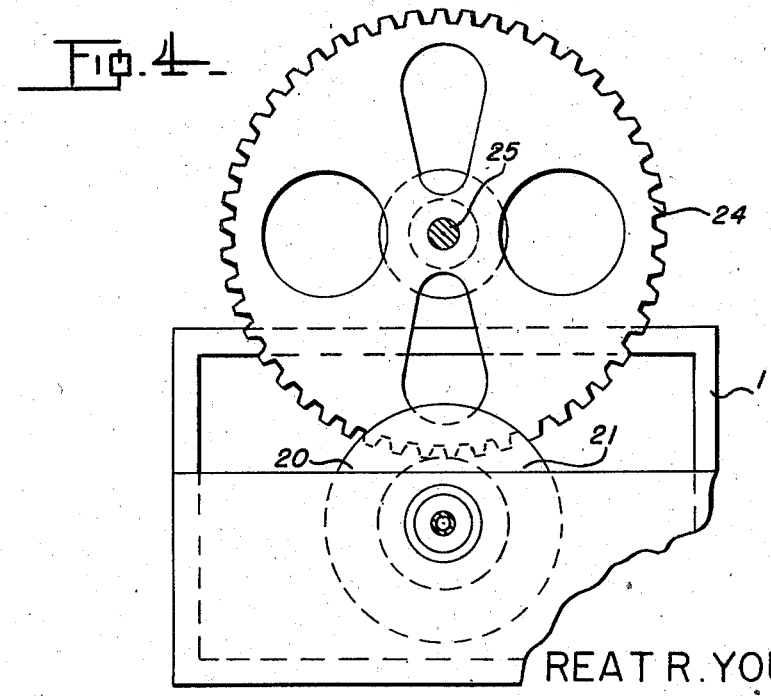
Figure 4 is a sectional view taken approximately on the line 4—4 of Figure 1 looking in the direction of the arrows.

Referring to the drawings in detail, the unit constructed in accordance with the invention, comprises a supporting stand or frame 10 having a riser 11 at one end, while at the other end is a bearing 12, this with the riser 11 has journaled therein inlet and outlet axle nipples or tubular shafts 13 and 14, the latter having a reduced flow passage 15 with respect to the larger flow passage 16 of the inlet nipple 13, and by separable couplings 17 there are joined to such nipples 13 and 14 supply and delivery pipe leads 18 and 19, respectively.

The nipples 13 and 14 communicate with a rotating cylinder 20, and form stub axles therefor, they being projected from reversed outwardly tapered or conical-shaped end heads 21 to the said cylinder.

Within the cylinder 20 and integrally built therewith is a feed spiral or double thread screw 22, which has its spiral increasing in the number of turns per unit of length from the supply nipple 13 to the delivery nipple 14. The supply nipple 13 carries a pinion 23 meshing with a driving gear 24, which latter is fixed to the driving shaft 25 of a power producing motor 26 preferably of the electric type, yet it may be of any other selected type, if desired.

The motor 26 is stationarily mounted on the riser 11, while the cylinder 20 is horizontally supported in the stand or frame 10, yet it may be otherwise positioned, if found desirable.

The supply of liquid is admitted through the nipple 13 into the spiral 22, within the cylinder 20, both rotatably driven together from the motor 26, and the admitted liquid is under pressure, which latter is boosted by the speed of rotation of the spiral and cylinder, when such liquid is delivered through the nipple 14 and discharged by the pipe lead 19 to a selected point of deposit.

What is claimed is:

In a fluid flow accelerator, the combination, which comprises, a cylinder having conical-shaped inlet and outlet ends, a double thread screw having continuous flat ribbon-like threads extending from end to end of the cylinder and projecting outwardly from a centrally disposed core and with the pitch of the threads gradually decreasing toward the outlet end providing a screw with an increasing number of turns per unit of length, the inner edges of the threads integral with the core and the outer edges in engagement with the inner surface of the cylinder, the first turn of each thread at the inlet end of the screw being relatively small in diameter and inclined to correspond with the slope of the conical surface at the end of the cylinder, tubular shafts extending from the ends of the cylinder having enlarged collars at the ends thereof, a gear on the shaft at one end of the cylinder, and coupling elements positioned over the said enlarged collars of the shafts connecting the ends of said tubular shafts to inlet and discharge pipes, said coupling elements providing journals in which the ends of the tubular shafts are rotatably mounted.

REAT R. YOUNGER.

REFERENCES CITED

The following references are of record in the file of this patent:

UNITED STATES PATENTS

| Number | Name | Date |
|---|---|---|
| 1,372,786 | Strong | Mar. 29, 1921 |

FOREIGN PATENTS

| Number | Country | Date |
|---|---|---|
| 214 | Great Britain | 1909 |
| 4,259 | Great Britain | Feb. 27, 1895 |